UNITED STATES PATENT OFFICE.

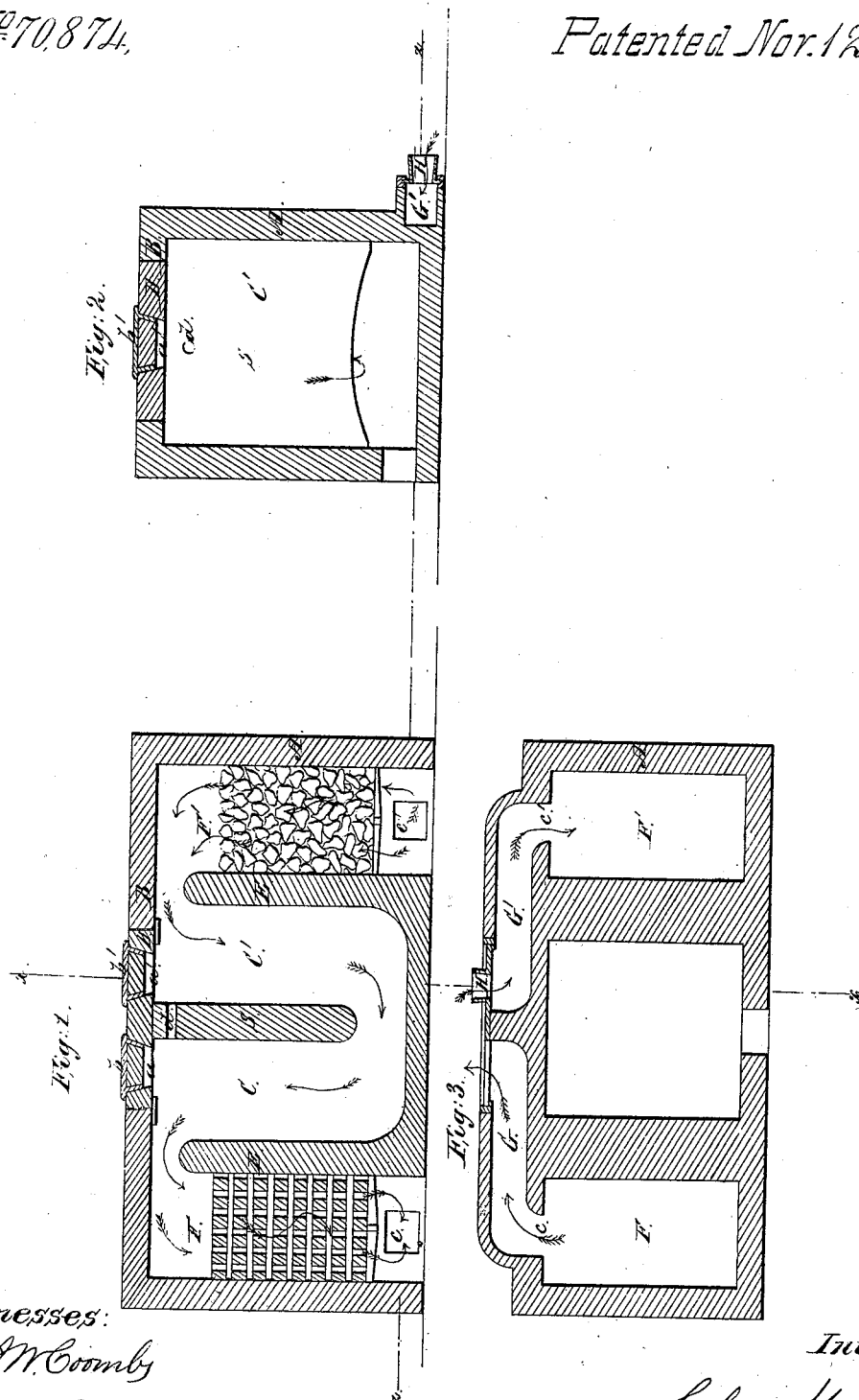

JABEZ MAUNTON, OF NEW YORK, N. Y., ASSIGNOR TO HIMSELF, WRIGHT DURYEA, WILLIAM ENNIS, J. H. VAN RIPER, A. P. CUMMINGS, AND J. WENDELL COLE, OF THE SAME PLACE.

IMPROVEMENT IN FURNACES FOR HEATING PURPOSES.

Specification forming part of Letters Patent No. 70,874, dated November 12, 1867.

*To all whom it may concern:*

Be it known that I, JABEZ MAUNTON, of the city, county, and State of New York, have invented a certain new and useful Improvement in Furnaces, of which the following is a full, clear, and exact description, reference being had to the accompanying drawings, forming part of this specification, and in which—

Figure 1 represents a vertical longitudinal section of a furnace constructed according to my improvement; Fig. 2, a vertical transverse section through the line $x\ x$ in Figs. 1 and 3; and Fig. 3, a horizontal section through the line $z\ z$ in Figs. 1 and 2.

Similar letters of reference indicate corresponding parts.

The nature of my invention consists in a novel combination of fuel or combustion chambers, for operation on the base-burning principle of action, with regenerators or regenerating-chambers and passages in connection therewith, under control of a valve for reversal of the draft, whereby great economy is induced, an intense heat may be produced, and the durability of the furnace is preserved. This, my improved furnace, is designed to be applied to heating purposes generally, including the heating of steam and other boilers.

Referring to the accompanying drawings, A represents the outer walls of the furnace, and B its roof. C C' are fuel-chambers therein, supplied, say, through apertures $a\ a'$ in the roof, or otherwise, at or near their top, which openings may be arranged in a removable cover, D, for distribution of the heat, and be furnished with lids $b\ b'$. Such feeding and distributing arrangements may, however, be changed, according to the purpose for which the furnace is designed to be applied.

These fuel or combustion chambers C C' are formed by a central transverse partition, S, extending downward from the roof, but stopping short of the bottom of the furnace, so as to establish communication between them below, and other transverse partitions E E projecting from below, but stopping short of the roof, and establishing upper communications with regenerators or regenerating-chambers F F', containing any suitable refractory material, arranged either in regular or irregular order, for circulation of the draft through them, and retention of the heat.

These regenerators are represented as of a vertical character, being provided with lower inlets and outlets, $c\ c'$, opening into passages G G', controlled by a slide or valve, H, which, accordingly as it is adjusted to the right or left, serves to make the passages G G' inlets or outlets, by admitting the air or blast through the one, and establishing the draft or escape through the other.

By this means, and alternating the position of the valve, is the current reversed through the furnace, to impart the heat passing off with the escaping products of combustion, or unconsumed gases, alternately to each regenerator, and whereby there is not only great economy, but an intensity of heat may be generated, as will be readily perceived by those acquainted with the working of furnaces on the regenerating principle of action generally.

But this, my improved furnace, has special advantages. Thus, both by the construction or arrangement of the combustion-chambers, to work on the base-burning principle of action, and arrangement of the regenerators, giving a downward course to the heated gases as they pass to or through them, the upper portion of the furnace is preserved from rapid destruction, though an intense heat be kept up in the fuel-chambers or base portion of the same, to the more perfect combustion of all inflammable gases, or the few of which that are not there consumed may be ignited above by air admitted through a passage or passages, $d$, connecting the one fuel-chamber with the other, at or near their tops.

The fuel also is better dried and ventilated by such construction and operation of the furnace; the same also where of a hard or solid character, such as coal or coke, serving in part as regenerating media; but I in nowise confine myself to any particular description of fuel.

What I here claim, and desire to secure by Letters Patent, is—

The combination of the fuel-chambers C C', arranged to connect for combustion at the base, and regenerators F F', in connection with said chambers at or near their tops, for operation with a reversible draft, substantially as specified.

JABEZ MAUNTON.

Witnesses:
J. W. COOMBS,
GEO. W. REED.